June 29, 1954     B. J. POWELL     2,682,178
HAND BRAKE LEVER ASSEMBLY
Filed Jan. 25, 1951     2 Sheets-Sheet 1
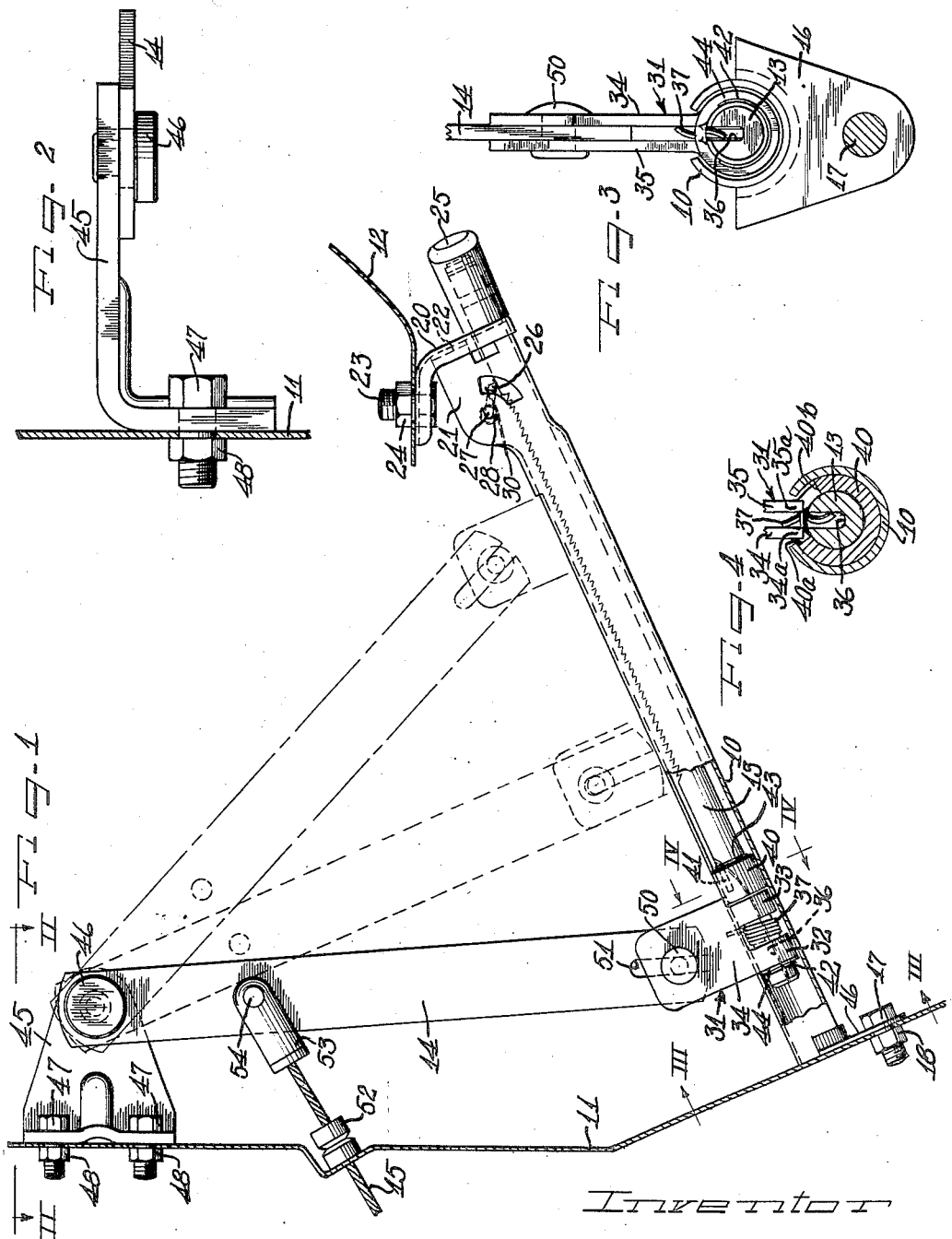
Inventor
Burnet J. Powell June 29, 1954   B. J. POWELL   2,682,178
HAND BRAKE LEVER ASSEMBLY
Filed Jan. 25, 1951   2 Sheets-Sheet 2
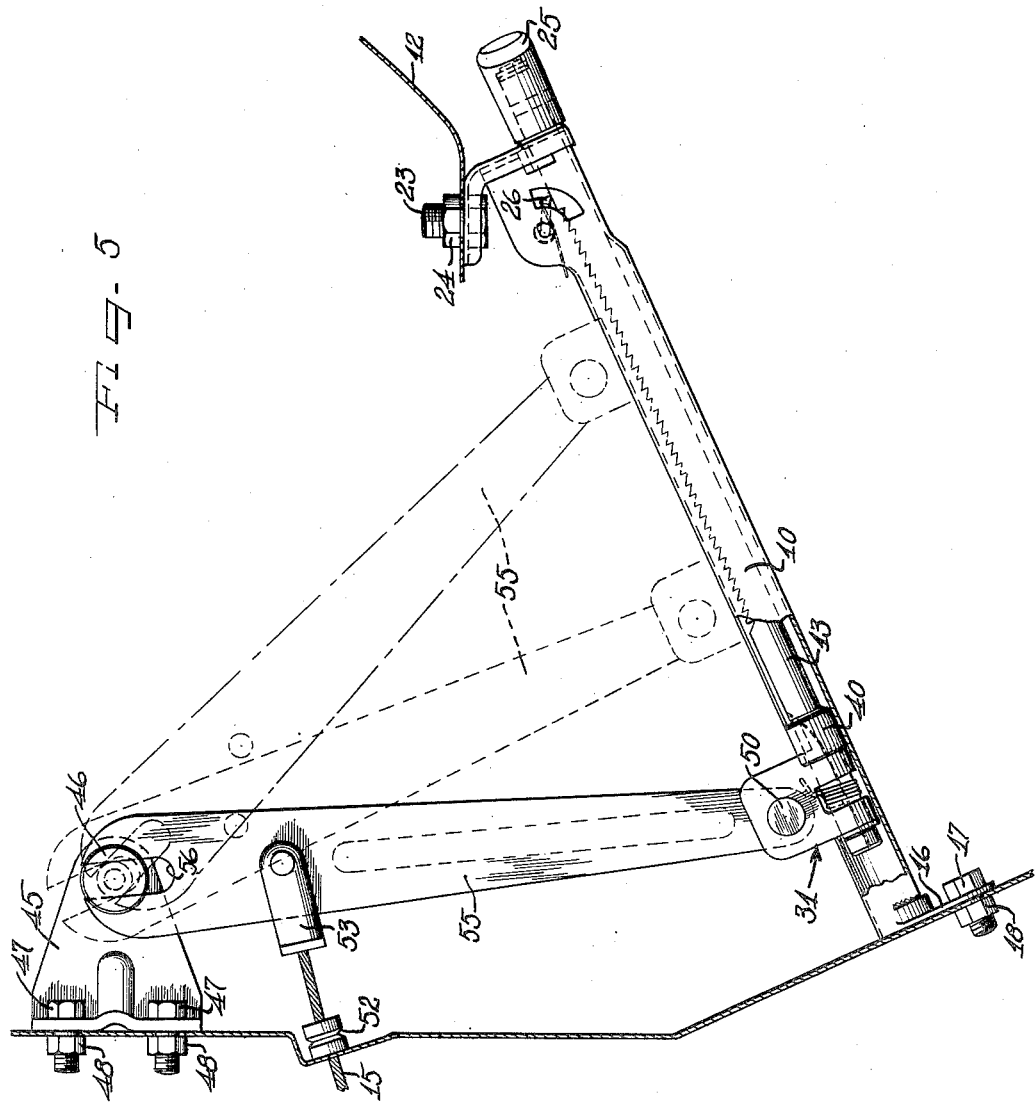
Inventor
Burnet J. Powell Patented June 29, 1954

2,682,178

UNITED STATES PATENT OFFICE 2,682,178

HAND BRAKE LEVER ASSEMBLY

Burnet J. Powell, North Chicago, Ill., assignor to Houdaille-Hershey Corporation, Detroit, Mich., a corporation of Michigan Application January 25, 1951, Serial No. 207,698

5 Claims. (Cl. 74—503)

The present invention relates to improvements in hand brake assemblies and more particularly to a brake lever assembly in which a cable is connected to a lever arm operated by a pull rod.

An object of this invention is to provide an improved brake actuating mechanism in which a rectilinearly movable pull rod is connected through a lever arrangement to a braking cable so that the pull rod can be readily operated to exert great braking force.

A feature of this invention is in the provision of a rectilinearly movable pull rod, a lever arm connectible to a braking cable, the lever arm being connected at one end to the pull rod and at the other end to a fixed bracket and means providing lost motion at one end of the arm.

Another object of this invention is to provide an improved hand brake lever assembly which is easily and simply constructed and which may be readily installed to an automobile or similar vehicle.

A further object of this invention is to provide a smoothly operated pull rod connected through lever means to a brake cable to exert great force on the braking mechanism.

A still further object of this invention is to provide an improved brake lever assembly in which a pull rod is mounted for rectilinear movement and is connected through a force multiplying lever mechanism to a brake cable.

Other objects, features and advantages of the present invention will be readily apparent from the following detailed description of certain preferred embodiments thereof taking in conjunction with the accompanying drawings, in which:

Figure 1 is a side elevational view of a brake lever assembly constructed in accordance with the principles of the present invention, certain parts being broken away for clarity;

Figure 2 is a sectional view, on an enlarged scale, taken substantially along line II—II of Figure 1;

Figure 3 is a sectional view, on an enlarged scale, taken substantially along the line III—III of Figure 1;

Figure 4 is a sectional view, on an enlarged scale, taken substantially along line IV—IV of Figure 1; and Figure 5 is a side elevational view of a modified brake lever assembly.

As shown on the drawings:

In general, the brake lever assembly illustrated in Figures 1 to 4 includes a sleeve 10 affixed at one end portion to a dash panel or fire wall 11 and at the other end to an instrument panel 12 and a ratcheted pull rod 13 slidably disposed in the sleeve and connected to a force multiplying lever arm 14 which has a brake mechanism operating cable 15 connected thereto.

The means for connecting the forward end portion of the sleeve 10 to the fire wall 11 includes a terminal flange 16 integral with the forward end of sleeve 10 and a bolt 17 and nut 18 affixing the terminal flange 16 to the fire wall 11.

The rearward end portion of the sleeve 10 is affixed to the instrument panel 12 by means including a bracket 20 affixed to the end of the sleeve, the sleeve having a pair of upwardly projecting side wall portions 21 which have laterally extending wing-like attachment flanges 22 secured to the bracket 20 by any desired means such as by welding. The bracket 20 may be secured to the instrument panel 12 by a bolt 23 and nut 24.

The pull rod 13 has a handle 25 by which it may be manually pulled rearwardly and rotated about its axis. The pull rod is normally rotatably biased to a position in which the ratcheted portion thereof is engageable with a pawl 26 so that, upon rearward movement of the pull rod to set the brakes, the pawl 26 serves to retain the pull rod and braking mechanism in position. The pull rod may be rotated by means of handle 25 to a position in which the pawl 26 is disengaged from the ratcheted portion for releasing the rod for forward movement to release the brakes.

The pawl 26 is pivotally supported by the sleeve 10 between the upwardly projecting side wall portions 21, the pawl being of plate-like form and having a pair of laterally projecting wing-like ears 27 extending into bearing openings 28 in the side wall portions 21. The pawl is biased clockwise (Figure 1) into ratchet engaging position by a wire spring 30 wound around one of the ears 27 and abutting at one end against a portion of sleeve 22 and at the other end against a portion of pawl 26.

The forward end portion of the pull rod 13 is connected to the lower end portion of the arm 14 by a connector, generally designated by reference numeral 31, which is fixed against axial movement on the pull rod 13, the pull rod being rotatable relative thereto. This connector 31 comprises a pair of spaced loop portions 32 and 33 which partially encircle the pull rod 13 and a pair of spaced radially and upwardly extending wall portions 34 and 35 which extend through a longitudinal slot in the upper portion of the sleeve 22 and connect the loop portions 32 and 33.

To urge the pull rod to a position in which the ratchet teeth thereon are engageable with the pawl 26, the pull rod has a slot 36 extending axially and radially in the forward end portion thereof and a spring 37 has one end anchored in slot 36, is wound around the pull rod between the loop portions 32 and 33, and has the other end thereof anchored between the spaced wall portions, as may be readily seen in Figures 1, 3 and 4.

To limit rotational movement of the pull rod 13, a short sleeve 40 encircles the pull rod contiguous the rear end of the connector 31. This sleeve 40 has a key 41 extending inwardly into the slot 36 to fix it against rotation on the pull rod. The sleeve has a recess in the forward end thereof providing a pair of stop shoulders 40a and 40b, as best illustrated in Figure 4. Rearward end portions 34a and 35a of the walls 34 and 35, respectively, of the connector 31 extend into this recess between the stop shoulders. The spring 37 normally holds the pull rod in a position in which the stop shoulder 40a is engaged with the portion 34a and in which the ratchet teeth of the pull rod are engageable by the pawl 26. The pull rod may, however, be rotated against the tension of spring 37 to a position in which the stop shoulder 40b is engaged with portion 35a and in which the ratchet teeth are disengaged from the pawl 26.

To limit axial displacement of both the connector 31 and sleeve 40 on the pull rod 13, a snap-on C-retainer 42 is disposed in a groove in the pull rod adjacent the forward end of connector 31 and a snap-on C-retainer 43 is disposed in a groove in the pull rod adjacent the rearward end of sleeve 40. If desired, a washer 44 may encircle the pull rod between retainer 42 and connector 31 to prevent rotation of the pull rod with respect to the connector from affecting the retainer 42.

According to this invention, one end portion of the brake mechanism operating arm is connected to a fixed portion of the vehicle, the other end portion is connected to the pull rod, and provision for lost-motion is made at one of the connections. In the embodiment illustrated in Figures 1-4, the upper end portion of the brake mechanism operating arm 14 is pivotally secured to a bracket 45 by means of a pin 46, the bracket being secured to fire wall 11 by bolts 47 and nuts 48. The lower end portion of the arm 14 extends between the spaced wall portions 34 and 35 of the connector 31. A pin 50 extends through the wall portions 34 and 35 and through a longitudinally extending slot 51 in the lower end portion of the arm 14. This structure permits the arm 14 to be pivoted by rectilinear movement of pull rod 13, as may be readily seen from the dotted and dot-dash positions illustrated in Figure 1.

The brake cable 15, which may be connected to any desired braking mechanism such as the parking or emergency brakes of a vehicle, extends through the fire wall 11 and through a guide sleeve 52 affixed to the fire wall 11 and is herein connected to an intermediate portion of the arm 14 by means of a connector clevis 53 pivoted on a pin 54 secured to arm 14.

Figure 5 illustrates a modified hand brake lever assembly which is the same, in all respects, as the assembly illustrated in Figures 1 to 4 except that a modified lever arm 55 is pivotally connected at its lower end portion to the connector 24 by means of the pin 50. The arm 55 has a slot 56 extending longitudinally in the upper end portion thereof through which the pin 46 extends, thereby providing a lost-motion connection between arm 55 and bracket 45. This lost-motion connection permits the arm 55 to pivot on pin 50 on the rectilinearly movable connector 31, as may be seen from the dotted and dot-wash positions illustrated in Figure 5.

It is thus seen that by this invention there is provided a hand brake lever assembly which may be easily operated to exert great force on a braking mechanism but can be readily released, functions smoothly, is simply and economically constructed, and can be readily installed in a vehicle.

It will be understood that modifications and variations may be effected without departing from the spirit and scope of the novel concepts of the present invention.

I claim as my invention:

1. A brake actuating assembly comprising, in combination, a first sleeve, means for affixing said first sleeve to a portion of a vehicle, a pull rod disposed in said first sleeve, said pull rod having a ratcheted portion extending longitudinally along one side thereof, a pawl carried by said first sleeve and engageable with said ratcheted portion, a connector on said pull rod, said connector comprising a pair of axially spaced loops partially encircling said pull rod and a pair of spaced radially extending wall portions connecting said loops, said first sleeve having a longitudinal slot therein through which said wall portions extend, said pull rod having a slot therein, a spring disposed around said pull rod between said spaced loops, one end of said spring extending into said slot in said pull rod, the other end of said spring extending between said spaced wall portions of said connector, a second sleeve fixed to said pull rod adjacent said connector, said second sleeve having a recess therein providing a pair of stop shoulders, portions of said wall portions of said connector extending into said recess and abutting against said stop shoulders to limit angular displacement of said pull rod, a bracket for attachment to another portion of the vehicle, a lever arm for operating braking means, means connecting one end of said arm to said bracket, and means connecting the other end of said arm to said connector, one of said connecting means providing lost-motion connection.

2. A brake lever assembly comprising, a rectilinearly movable pull rod, a brake operating lever arm, means pivotally connecting one end of said arm to said pull rod, means for connecting the other end of said arm to a fixed portion of a vehicle, said arm extending upwardly from said connecting means at said one end and being supported thereby, and said other end connecting means at the upper end of said arm comprising a slot and a pin for riding in said slot to provide a lost-motion connection between said arm and said fixed portion of the vehicle.

3. A brake actuating assembly comprising in combination, a sleeve, means for affixing said sleeve fixedly to a portion of a vehicle, a pull rod disposed in said sleeve for rectilinear reciprocal and rotary movements only, said pull rod and said sleeve having cooperating interengageable means for holding the rod in incremental brake setting reciprocal positions and releasable by rotation of the rod, said sleeve having a longitudinal slot therein, a connector engaging said rod and including a radially extending portion extending through said slot and slidable longitudinally along said slot upon rectilinear movement of said pull rod, a bracket for fixed attachment to another portion of the vehicle, a lever arm extending from said bracket for operating brake means, means connecting one end of said arm pivotally to said bracket, and means connecting the other end of said arm pivotally to said radially extending portion of said connector, one of said connecting means providing a lost-motion connection to compensate for the arcuate swinging of the lever during reciprocal movements of the rod.

4. A brake actuating assembly comprising, in combination, a sleeve, means for affixing said sleeve to a portion of a vehicle, a pull rod disposed in said sleeve for rectilinear and rotary movement only, said pull rod having a ratcheted portion extending longitudinally along one side thereof, a pawl carried by said sleeve engageable with said ratcheted portion, said sleeve having a longitudinal slot therein, a connector engaging said pull rod and including a radially extending wall portion extending through said slot and slidable longitudinally along said slot upon movement of said pull rod, a bracket for attachment to another portion of the vehicle, a lever arm for operating brake means depending from said bracket, means connecting one end of said arm to said bracket, and means connecting the other end of said arm to said radially extending wall portion of said connector, said last mentioned connecting means comprising a pivot connection between said radially extending wall portion and said arm, and said first mentioned connecting means comprising a longitudinal slot and a pin riding in said slot to afford a lost-motion connection.

5. A brake lever assembly for a vehicle comprising, in combination, a pull rod, a guide sleeve about said rod, means for affixing said sleeve to a portion of a vehicle to mount the sleeve in fixed orientation, said sleeve constraining said pull rod for rectilinear reciprocal movement and rotation therein, a brake-operating lever arm, means connecting said pull rod to one end portion of said arm, a bracket for connection to a fixed portion of the vehicle, means for connecting the opposite end portion of said arm and said bracket for swinging movement, one of said connecting means including a lost-motion connection to compensate for arcuate travel of the arm relative to the bracket and the rectilinearly moving rod, and means for holding said pull rod in a brake-setting position to which moved rectilinearly and releasable by rotation of said pull rod.

References Cited in the file of this patent

UNITED STATES PATENTS

| Number | Name | Date |
|---|---|---|
| 483,800 | Bellows | Oct. 4, 1892 |
| 1,330,715 | Mason et al. | Feb. 10, 1920 |
| 1,394,645 | Schmidt | Oct. 25, 1921 |
| 1,839,908 | Weatherhead | Jan. 5, 1932 |
| 1,975,492 | Wyndham | Oct. 2, 1934 |
| 2,278,645 | Chase | Apr. 7, 1942 |
| 2,295,792 | Jandus | Sept. 15, 1942 |
| 2,329,722 | Jandus | Sept. 21, 1943 |
| 2,377,691 | Jandus | June 5, 1945 |
| 2,430,418 | Arens | Nov. 4, 1947 |
| 2,543,509 | Sandberg | Feb. 27, 1951 |